United States Patent
Semple et al.

(10) Patent No.: US 9,528,368 B2
(45) Date of Patent: Dec. 27, 2016

(54) METAL BELLOWS CONDITION MONITORING SYSTEM

(71) Applicant: Baker Hughes Incorporated, Houston, TX (US)

(72) Inventors: Ryan P. Semple, Owasso, OK (US); David Tanner, Broken Arrow, OK (US)

(73) Assignee: BAKER HUGHES INCORPORATED, Houston, TX (US)

( * ) Notice: Subject to any disclaimer, the term of this patent is extended or adjusted under 35 U.S.C. 154(b) by 136 days.

(21) Appl. No.: 14/340,391

(22) Filed: Jul. 24, 2014

(65) Prior Publication Data

US 2015/0052989 A1  Feb. 26, 2015

Related U.S. Application Data

(60) Provisional application No. 61/867,748, filed on Aug. 20, 2013, provisional application No. 61/902,340, filed on Nov. 11, 2013.

(51) Int. Cl.
| | |
|---|---|
| *E21B 47/00* | (2012.01) |
| *G01L 9/00* | (2006.01) |
| *E21B 43/12* | (2006.01) |
| *G01L 13/02* | (2006.01) |
| *E21B 47/06* | (2012.01) |

(52) U.S. Cl.
CPC .............. *E21B 47/06* (2013.01); *E21B 43/128* (2013.01); *E21B 47/0007* (2013.01); *G01L 9/0039* (2013.01); *G01L 13/023* (2013.01)

(58) Field of Classification Search
CPC .... E21B 47/06; E21B 47/0007; E21B 43/128; G01L 9/0039; G01L 13/023
See application file for complete search history.

(56) References Cited

U.S. PATENT DOCUMENTS

| | | | | |
|---|---|---|---|---|
| 2,312,201 | A | * | 2/1943 | Thompson .............. G01L 13/02 137/386 |
| 2,590,324 | A | * | 3/1952 | Jones .................... G01L 13/023 73/708 |
| 2,917,081 | A | * | 12/1959 | Nolte ........................ G01L 7/00 92/11 |
| 2,989,084 | A | * | 6/1961 | Jones ..................... G01L 7/063 73/729.1 |
| 3,301,063 | A | * | 1/1967 | Kisling, III ............. E21B 47/06 73/152.53 |
| 3,301,064 | A | * | 1/1967 | Kisling, III ............. E21B 47/06 73/152.53 |
| 3,472,077 | A | * | 10/1969 | Bucalo ...................... G01L 7/00 200/83 D |
| 3,744,307 | A | * | 7/1973 | Harper .................... E21B 47/06 73/152.51 |
| 3,756,085 | A | * | 9/1973 | Hunter .................. G01L 13/023 73/720 |
| 4,064,751 | A | * | 12/1977 | Deisenroth ............. G01F 1/386 73/861.53 |
| 4,358,956 | A | * | 11/1982 | Ruben ..................... G01F 23/18 338/42 |

(Continued)

*Primary Examiner* — John Fitzgerald
(74) *Attorney, Agent, or Firm* — Shawn Hunter (57) ABSTRACT

A system for monitoring conditions associated with a pressure-equalizing bellows element within a seal section of an electric submersible pump assembly. Pressure sensors are associated with the seal section to detect differential pressure across the bellows element.

14 Claims, 7 Drawing Sheets

(56) References Cited

U.S. PATENT DOCUMENTS

| | | | | |
|---|---|---|---|---|
| 5,115,675 A * | 5/1992 | Feldman | ................ | G01L 9/0013 |
| | | | | 73/704 |
| 5,457,999 A * | 10/1995 | Feldman | ................ | G01L 9/0013 |
| | | | | 73/704 |
| 2002/0192090 A1* | 12/2002 | Du | ................ | E21B 43/128 |
| | | | | 417/423.11 |
| 2003/0106381 A1 | 6/2003 | Krouth et al. | | |
| 2004/0146415 A1* | 7/2004 | Merrill | ................ | F04D 13/083 |
| | | | | 417/414 |
| 2009/0044956 A1* | 2/2009 | Nicholson | ................ | H01R 13/533 |
| | | | | 166/382 |
| 2011/0274565 A1* | 11/2011 | Tetzlaff | ................ | F04B 47/06 |
| | | | | 417/321 |
| 2013/0272898 A1* | 10/2013 | Toh | ................ | F04D 15/00 |
| | | | | 417/44.1 |

\* cited by examiner

When bellows are expanded (x>0), P2>P1

FIG. 8

When bellows are at neutral axis (x=0), P2=P1

When bellows are contracted (x<0), P2<P1

FIG. 9

METAL BELLOWS CONDITION MONITORING SYSTEM

BACKGROUND OF THE INVENTION

1. Field of the Invention

The invention relates generally to devices and methods for operation and monitoring operational details of downhole seal assemblies. In particular aspects, the invention relates to arrangements for such monitoring of seal assemblies that incorporate metal bellows style chambers.

2. Description of the Related Art

Electric submersible pump (ESP) assemblies are routinely used in the production of hydrocarbons from wells. A typical ESP includes a downhole motor that generates power used to operate a pump device. A seal assembly or seal section is typically provided between the motor and pump. The seal assembly includes an outer housing and shaft that is used to transmit torque from the motor to the pump. The seal equalizes fluid pressure so that the inside of the motor and seal are at equal pressure with the wellbore or outside environment. The seal assembly usually provides a series of chambers that prevent or slow ingress of well fluids from the seal head to the motor. The seal also allows for motor oil thermal expansion and contraction.

The chambers of the seal assembly can have various configurations. Labyrinth-style chambers and barrier-style chambers are two known types. Two types of barriers are elastomeric and metal bellows.

SUMMARY OF THE INVENTION

This invention provides a method for real-time condition monitoring of the remaining contraction capacity of a seal section configured with metal bellows. This device will add an indication of the operational health of the ESP system to compliment traditional monitored parameter such as current, motor winding temperature and vibration. This information can be used to prevent premature failure or provide the operator with information that failure may occur in the near-term so that preparations could be made.

According to a described embodiment, a seal section for an ESP is provided with a pressure monitoring system that detects the differential pressure across the bellows. An exemplary ESP seal section is described that is located between a pump and motor in an ESP assembly. The exemplary ESP seal section includes an outer housing that radially surrounds a central shaft. A bellows chamber is defined radially between the shaft and the housing and contains a bellows element that expands in an axial manner in response to changes in fluid volume to the pressure and/or temperature. The bellows element separates the bellows chamber into first and second chamber portions, each of which retains a separate fluid. In described embodiments, the bellows element is made up of an inner bellows portion interconnected to an outer bellows portion. Each of the bellows portions is made up of a number of convolutions which allows the bellows portion to expand and contract axially in the manner of an accordion.

In exemplary embodiments, the pressure monitoring system includes one or more sensors that are capable of measuring differential pressure across the bellows element. In described embodiments, the sensors include pressure transducers and fiber optic sensors.

The pressure monitoring system also preferably includes a controller which can be used to calculate differential pressure across the bellows element and determines axial configuration of the bellows element within the bellows chamber. The pressure monitoring system of the present invention permits an operator to determine volume and capacity for chambers within the seal section.

BRIEF DESCRIPTION OF THE DRAWINGS

The advantages and further aspects of the invention will be readily appreciated by those of ordinary skill in the art as the same becomes better understood by reference to the following detailed description when considered in conjunction with the accompanying drawings in which like reference characters designate like or similar elements throughout the several figures of the drawing and wherein.

DETAILED DESCRIPTION OF THE PREFERRED EMBODIMENTS

Figure 1:
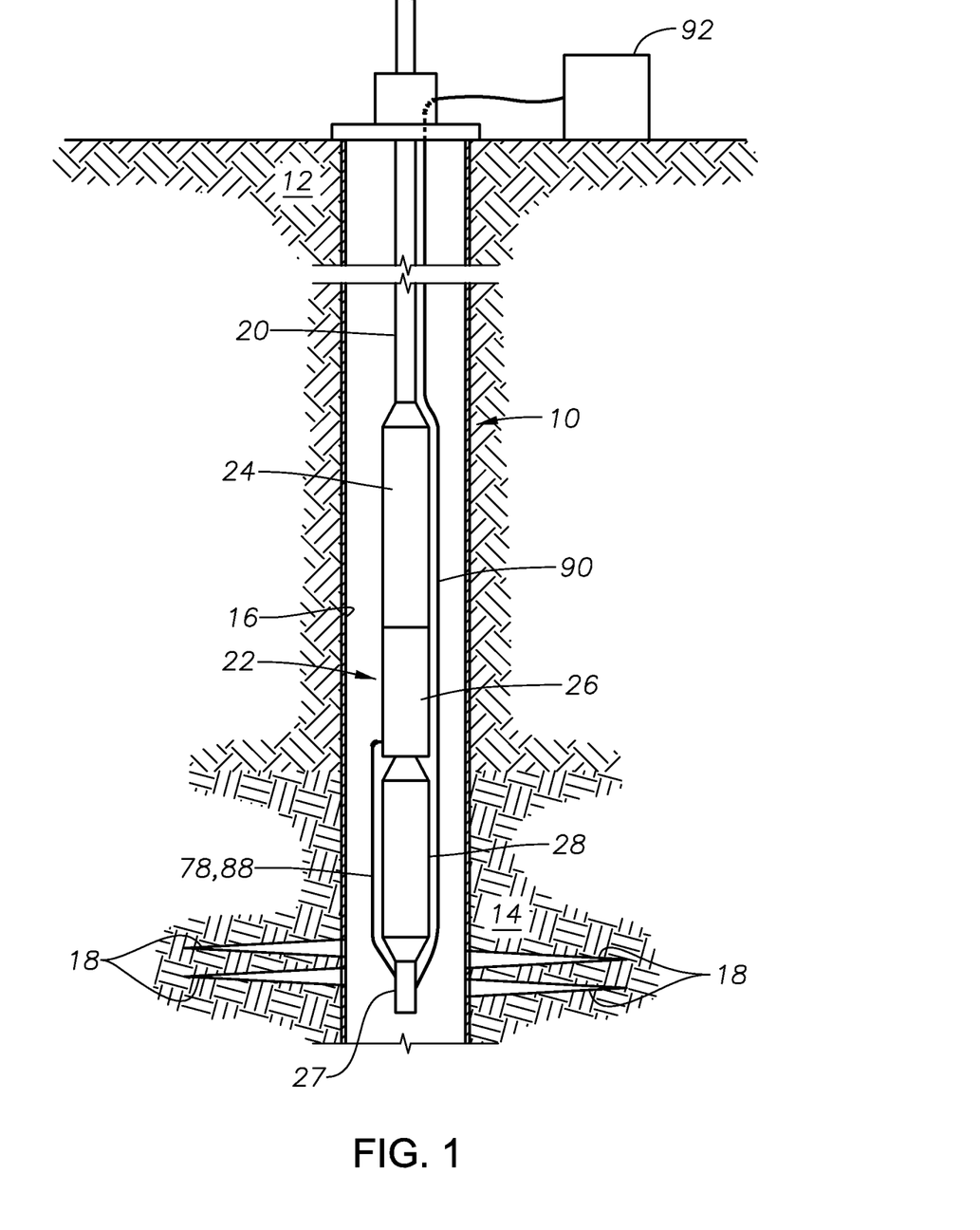
FIG. 1 is a side, cross-sectional view of an exemplary electrical submersible pump assembly which contains a seal section.

FIG. 1 illustrates an exemplary wellbore 10 that has been drilled through the earth 12 down to a subterranean hydrocarbon-bearing formation 14. The wellbore 16 has a metallic casing 16 of a type known in the art. Perforations 18 are disposed through the casing 16 and into the formation 14.

Production tubing 20 is disposed within the wellbore 10, having been run in from the surface in a manner known in the art. The production tubing 20 may be coiled tubing or it may be a string of production tubing members that are interconnected by threaded connection. An electric submersible pump (ESP) assembly 22 is affixed to the lower end of the production tubing 20. The exemplary ESP assembly 22 includes a centrifugal pump 24 which is affixed at its lower end to a seal section 26. The seal section 26 interconnects the lower end of the pump 24 to a motor 28. The motor 28 is of a type known in the art and may be a three-phase electrical motor. An electronics sub or gage unit 27 is secured to the lower end of the motor 28.

The seal section 26 used to equalize the pressure of lubricant contained within the motor 28 with well fluid on the exterior of the seal section 26. The seal section 26 will typically contain a number of pressure equalization chambers. Some of these chambers may be labyrinth-style chambers or bag-style chambers, of types that are known in the art. At least one of the chambers of the seal section 26, however, is a bellows-style pressure equalizing chamber of the type described herein.

Figure 2:
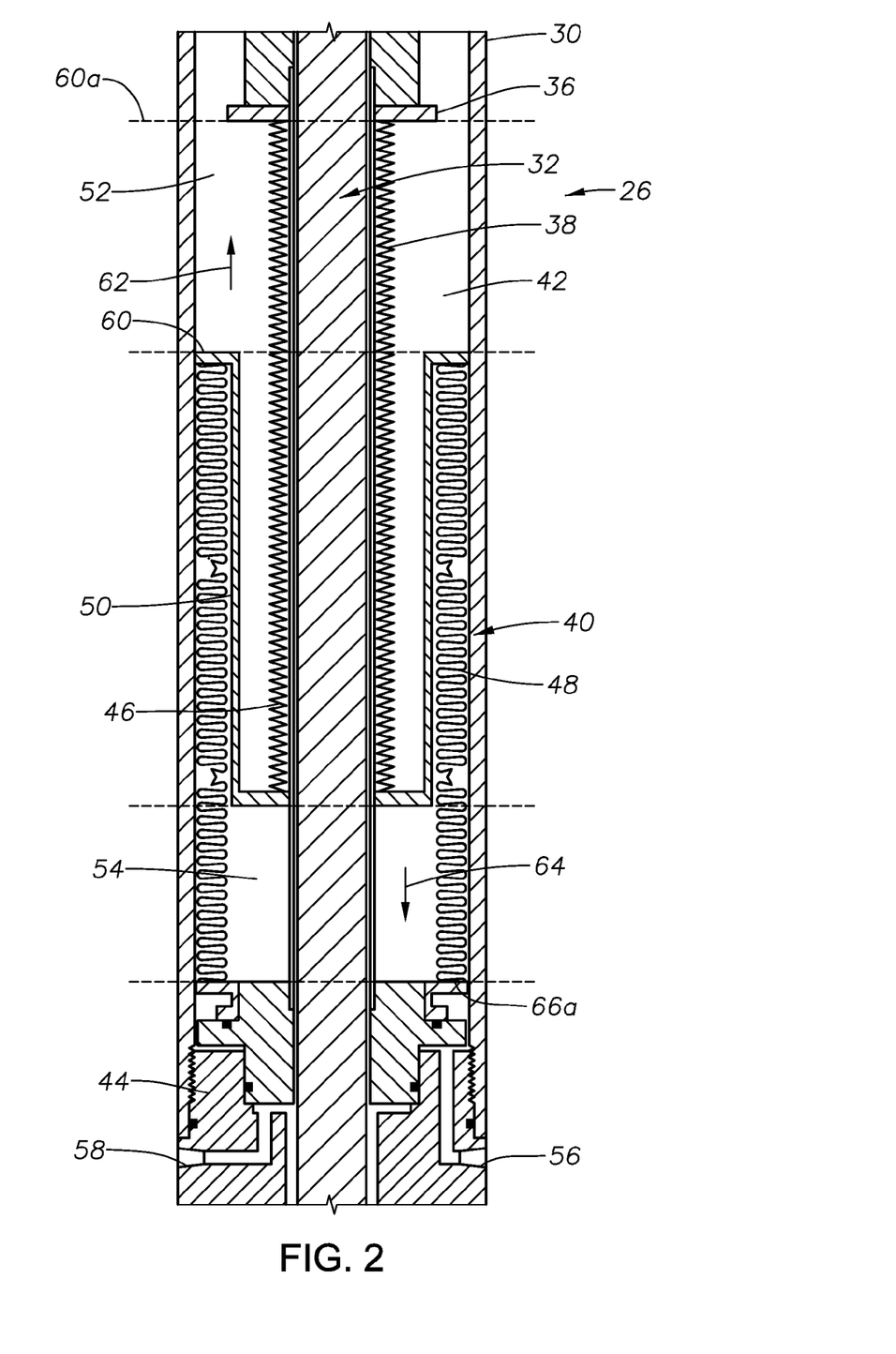
FIG. 2 is a schematic drawing illustrating a bellows assembly within a bellows chamber in a resting condition.

FIG. 2 is a side, cross-sectional view of the seal section 26 which largely shows a single bellows chamber 42 therewithin. The seal section 26 has an outer radial housing 30.

A central power transfer shaft 32 is retained within the seal section 26 and is axially rotatable with respect to the outer housing 30 of the seal section 26. The power transfer shaft 32 is used to transmit torque and power from the motor 28 to the pump 24 is in order to drive pump 24. An upper flange 36 is located proximate an upper end of the housing 30 and radially surrounds the shaft 32. A guide tube 38 radially surrounds the shaft 32 as well.

A pressure equalizing bellows assembly, generally indicated at 40, is located within bellows chamber 42 that is defined between the shaft 32 and the outer housing 30. The bellows chamber 42 is bounded at its lower end by a connecting portion 44 which interconnects the bellows chamber 42 to an adjoining bellows chamber. The bellows assembly 40, in a preferred embodiment, includes a radially inner bellows portion 46 and a radially outer bellows portion 48. The inner and outer bellows portions, 46, 48 are interconnected by an annular interconnecting sleeve 50 which is affixed to an axial end of the inner bellows portion 46 and an axial end of the outer bellows portion 48. Each bellows portion 46, 48 is made up of a number of convolutions and is capable of expanding and contracting axially in an accordion-like fashion. The bellows assembly 40 divides the bellows chamber 42 into a first, or upper, chamber portion 52 and a second, or lower, chamber portion 54.

An outer fluid flow port 56 is defined within the connecting portion 44 and permits external wellbore fluid to be communicated into or from the upper chamber portion 52 of the bellows chamber 42. An inner fluid flow port 58 allows fluid communication between the lower chamber portion 54 and an external fluid source. A pressure-balancing fluid, such as oil, is preferably contained within the lower chamber portion 54.

When fluid pressure within the lower chamber portion 54 exceeds the fluid pressure within the upper chamber portion 52, the axial end 60 of the outer bellows portion 48 will move axially in the direction of arrow 62 as the convolutions of the outer bellows portion 48 expand. Concomitantly, the convolutions of the inner bellows portion 46 will collapse. The maximum extent of axial movement of the axial end 60 is indicated at 60a in FIG. 2. It is noted that the bellows assembly 40 has a natural spring rate ("k") which can be measured.

When fluid pressure within the lower chamber portion 54 is lower than the fluid pressure within the upper chamber portion 52, the outer bellows portion 48 will collapse. The inner bellows portion 46 will expand axially in the direction of arrow 64. The maximum extent of axial movement of the axial end 66 of the inner bellows portion 46 is indicated at 66a in FIG. 2.

Figure 3:
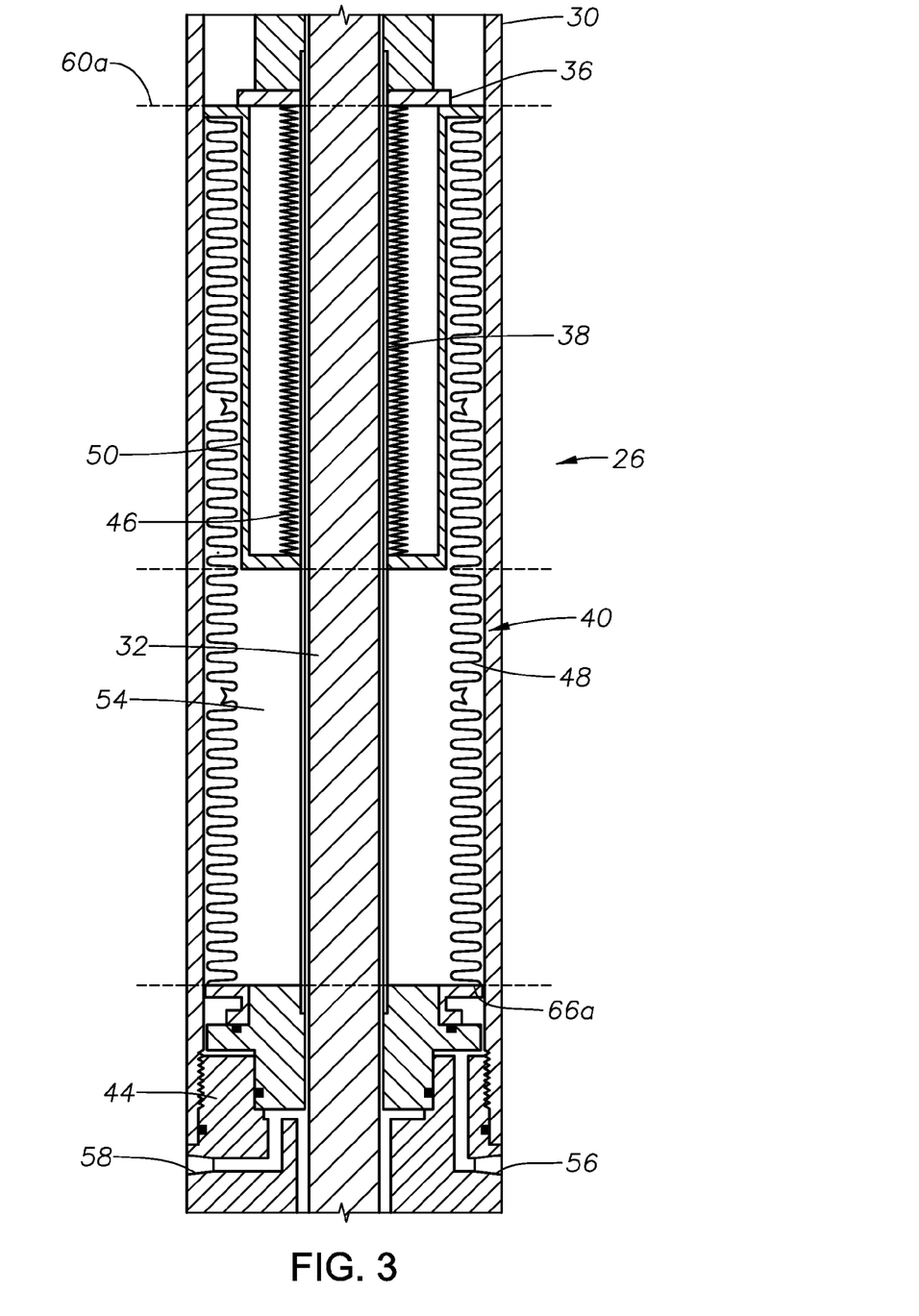
FIG. 3 is a schematic view of the bellows assembly of FIG. 2 now axially expanded in one direction.
Figure 4:
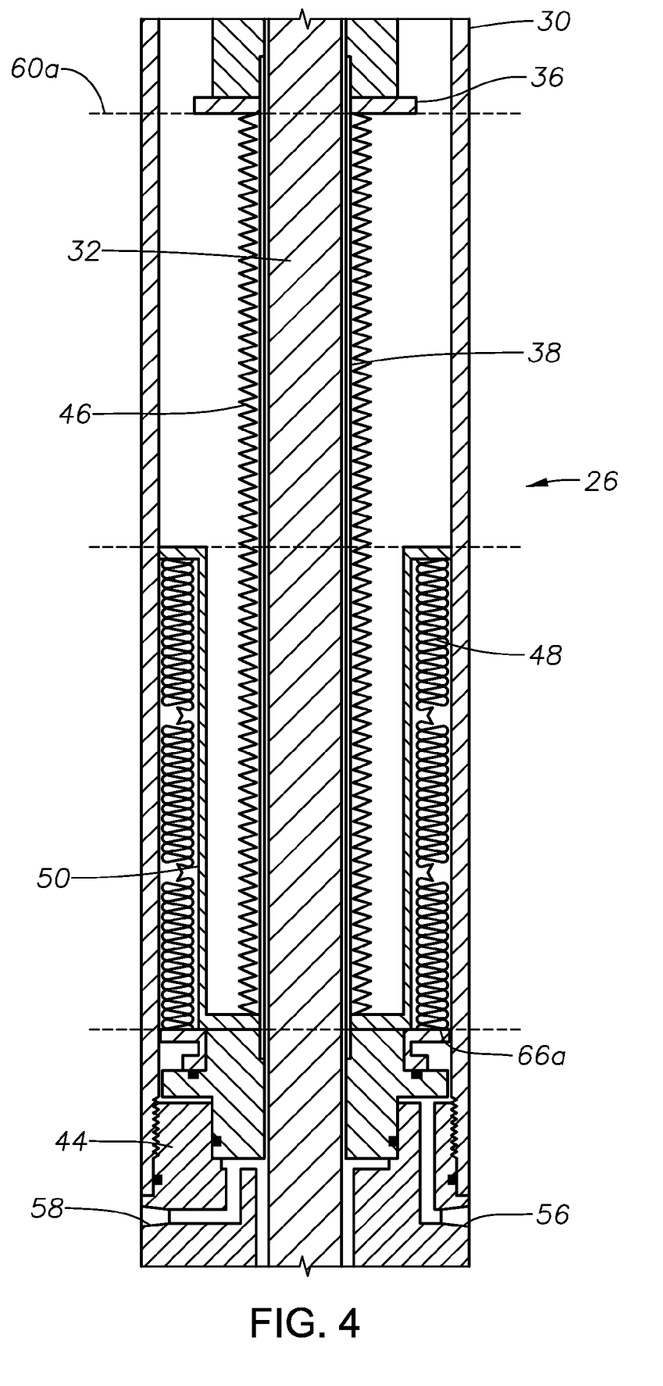
FIG. 4 is a schematic view of the bellows assembly of FIGS. 2-3 now axially contracted in a second direction.

FIG. 3 illustrates that increased temperature and/or pressure of oil within the lower chamber portion 54 has moved the bellows assembly 40 in the direction 62 to the position shown. FIG. 4 depicts a condition wherein the pressure within the lower chamber portion 54 is less than the pressure within the upper chamber portion 52. As a result, the bellows assembly 40 will contract and move axially in the direction 64 to the position depicted in FIG. 4.

Figure 5:
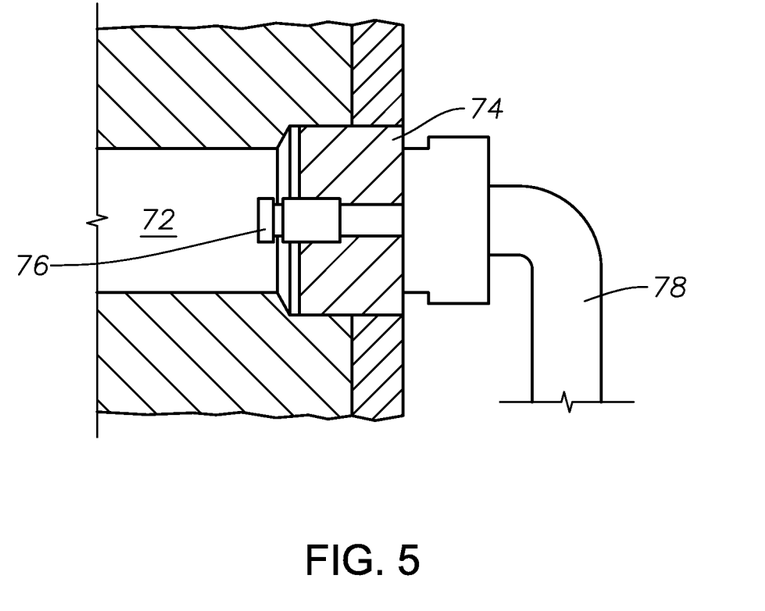
FIG. 5 is an enlarged cross-sectional detail view of an exemplary fluid port and plug containing a pressure transducer.

FIG. 5 illustrates an exemplary fluid passage 72 which is closed off by plug 74. A pressure transducer 76 is retained within the plug 74 and is maintained in contact with fluid within the fluid passage 72. The exemplary fluid passage 72 may be the fluid port 56 or the fluid port 58. The pressure transducer 76 is capable of detecting the fluid pressure within the fluid passage 72. Electrical conduit 78 extends from the pressure transducer 76 to the electronics sub 27.

Figure 6:
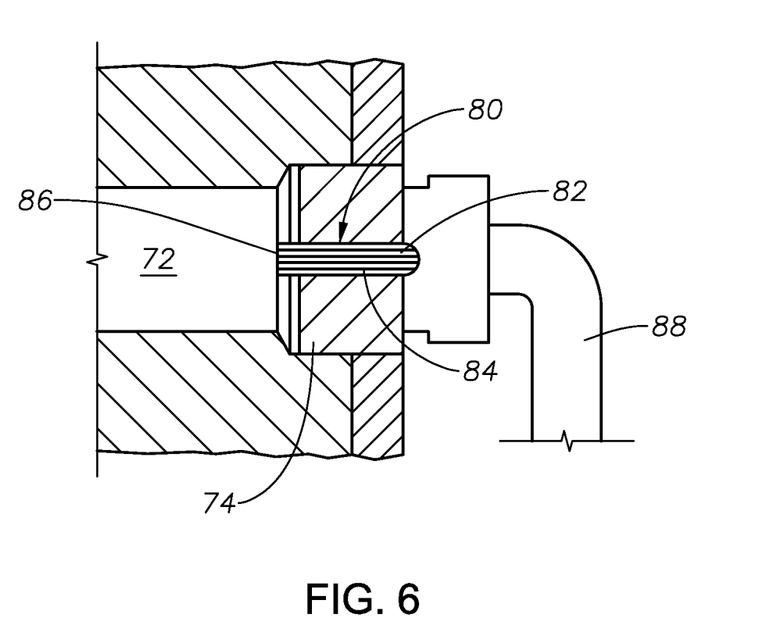
FIG. 6 is an enlarged, cross-sectional detail view of an exemplary fluid port and plug containing a fiber optic probe.

FIG. 6 illustrates an alternative arrangement to that depicted in FIG. 5 for detection of fluid pressure within a fluid passage 72. A fiber optic probe 80 is retained within plug 74 and is maintained in contact with fluid within the fluid passage 72. The fiber optic probe 80 includes a central axial fiber core 82 which is radially surrounded by cladding 84. The axial end 86 of the probe 80 is maintained in contact with fluid in the fluid passage 72. Fiber optic cable 88 extends from the plug 74 to the electronics sub/gage unit 27. The fiber optic probe 80, when interconnected with suitable reflectometry instrumentation, is capable of detecting the fluid pressure within the fluid passage 72.

Electronics sub/gage unit 27 preferably contains a programmable controller for operation of the pressure monitoring system of the present invention. In preferred embodiments, data cable 90 (see FIG. 1) extends from the electronics sub 27 to storage and/or display equipment 92 at the surface of the wellbore 10. The surface-based storage and/or display equipment 92 may include suitable software, processors and visual or auditory displays.

In instances wherein fiber optic probes are used, such as fiber optic probe 80, the electronics sub 27 would preferably include a fiber management bowl with a splice tray which allows the fiber optic cable 88 to be joined into a protected cable which is run from the electronics sub 27 to equipment at the surface of the wellbore 10. A suitable fiber management bowl for use in this application is the SUREVIEW™ ESP Optical Stinger that is available commercially from Baker Hughes Incorporated of Houston, Tex. The surface-based equipment to which the protected optical cable would be run preferably includes an optical time-domain reflectometer ("OTDR"), of a type known in the art, which is capable of transmitting optical pulses into the fiber optic cable and analyzing the light that is returned, reflected or scattered therein. Absolute fluid pressure and changes in fluid pressure occurring at the axial end 86 of the optic fiber probe 80 can be thus determined by the OTDR. A signal indicative of the determined pressure can then be recorded and or displayed at surface by the equipment 92.

In operation, transducers 76 and/or fiber optic probes 80 are used to detect the fluid pressure within fluid passages 56 and 58. The pressure within fluid passage 56 is representative of the fluid pressure within the upper chamber portion 48 and a first side of the bellows element 42. The pressure within fluid passage 60 is representative of the fluid pressure within the lower chamber portion 50 and a second side of the bellows element 42. The difference between the pressures detected in fluid passages 56 and 60 is the difference in pressures on first and second sides of the bellows element 42 and will yield the differential pressure across the bellows assembly 37.

Figure 7:
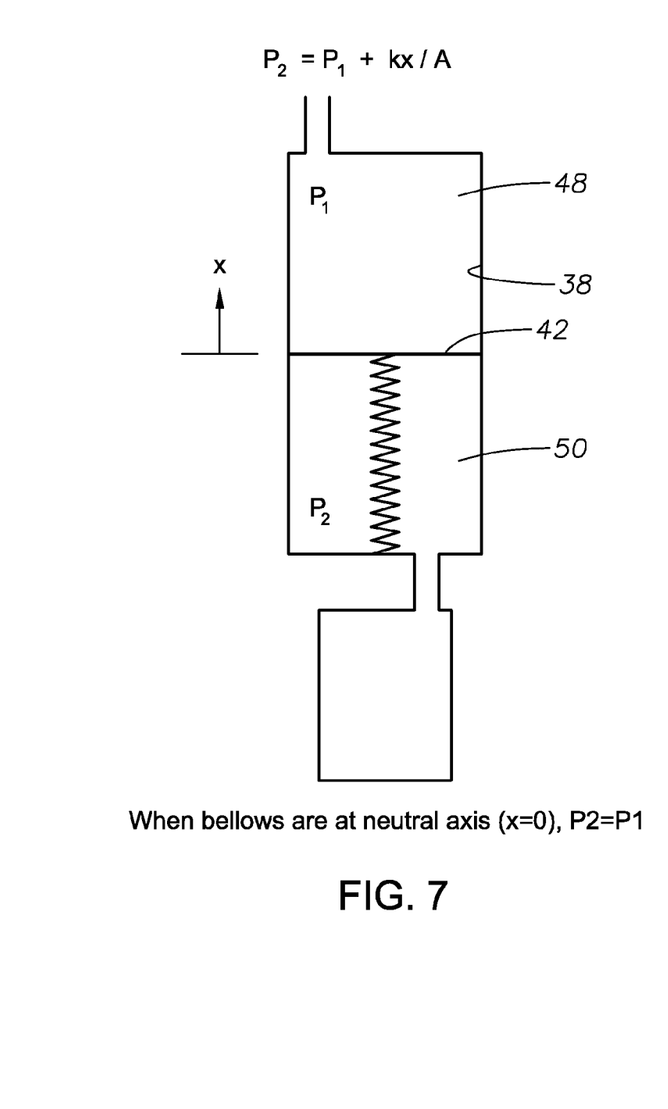
FIG. 7 is a schematic drawing depicting a seal section with bellows element at neutral axis.
Figure 8:
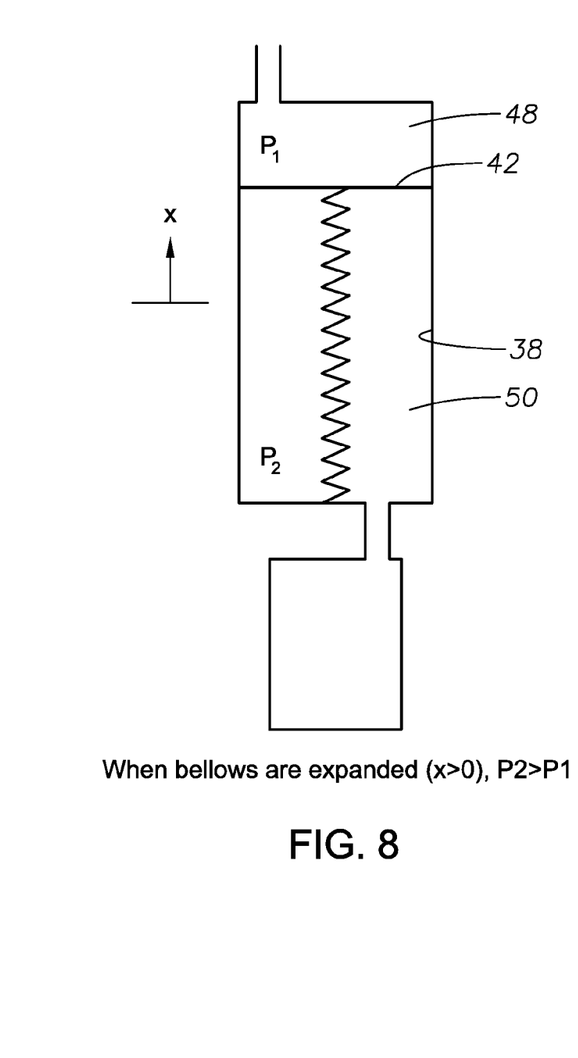
FIG. 8 is a schematic drawing depicting a seal section with bellows element expanded.
Figure 9:
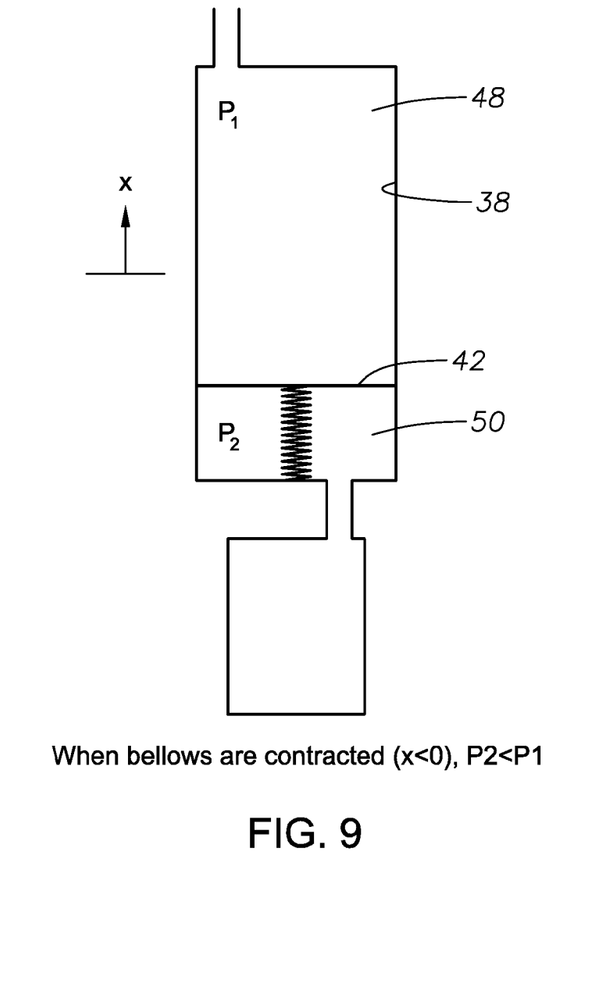
FIG. 9 is a further schematic drawing of the seal section shown in FIGS. 7-8.

Measurement of the pressure differential across the bellows element 42 can be used to determine the displacement of the bellows element 42 within the bellows chamber 38 or the axial position of the bellows element 42 within the bellows chamber 38. FIGS. 7-10 illustrate the relationship between the differential pressure and the axial location of the bellows element 42 within the seal section 26. FIGS. 7-10 are schematic depictions of the seal section 26 with the bellows element 42 being shown in a simplified manner. FIG. 7 depicts the bellows element 42 at a neutral axis (x=0) which occurs when the pressure in the upper chamber portion 48 ($P_1$) is equal to the pressure in the lower chamber portion 50 ($P_2$). FIG. 8 depicts a condition wherein the pressure in the lower chamber portion 50 ($P_2$) is greater than the pressure in the upper chamber portion 48 ($P_1$). As a result, the bellows element 42 is moved in the direction 49 for a distance of "x". FIG. 9 illustrates a condition wherein the pressure in the lower chamber portion 50 ($P_2$) is lower than the pressure in the upper chamber portion 48 ($P_1$). The inventors have recognized that the pressures $P_1$ and $P_2$ can be related by the equation:

$$P_2 = P_1 + kx/A$$

Where:
"k" is the spring rate of the bellows element 42,
"x" is the distance of axial movement of the bellows element 42 within the bellows chamber 38; and
"A" is the cross sectional area of the swept path that the bellows follow.

Figure 10:
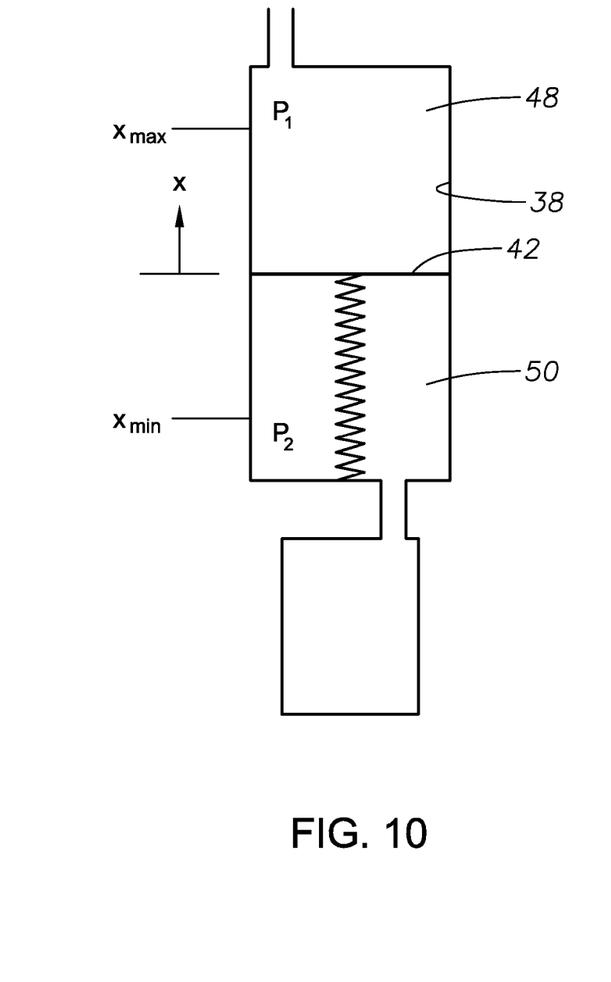
FIG. 10 is a further schematic drawing of the seal section shown in FIGS. 7-9.

The inventors have recognized that, if the spring rate (k) is known, a measurement of the pressure differential ($P_2 - P_1$) can be used to calculate the displacement (x) of the bellows assembly 40. With reference to FIG. 10, knowledge of the bellows displacement will give the remaining bellows capacity.

$$\text{Bellows capacity} = \frac{x - x\min}{x\max - x\min}$$

Determination of the axial location of the bellows assembly 40 within the bellows chamber 42 can be determined by either the controller within the electronics sub 27 or, alternatively, by a controller within surface-based equipment 92.

The present invention provides apparatuses and methods to provide real-time condition monitoring of the remaining contraction capacity of a seal section 26 configured with metal bellows assembly 40. Devices and methods in accordance with the present invention will add indications of the operational health of the electric submersible pump ("ESP") system to compliment traditional monitored parameters, such as current, motor winding temperature and vibration. This information can be used to prevent premature failure or provide the operator with information that failure may occur in the near-term so that preparations could be made. The premise of this device is based on a unique characteristic of a metal bellows assembly 40 in that it has "spring rate". A traditional elastomeric bag or labyrinth chamber does not have characteristic. The bellows assembly 40 is formed by inner and outer bellows portions 46, 48 that work in opposition to form a lower chamber portion 54 that is used to hold oil. The bellows assembly 40 regulates the volume of this oil in order to pressure compensate the motor 28 with the wellbore 10 and to handle the thermal contraction and expansion of the motor oil at it goes through thermal changes. The bellows assembly 40 expands and contracts by changing length, and the bellows element also has a "free state" (see FIG. 2) like a spring. A tensile force is needed to lengthen the bellows beyond the free state length, and this force is provided by a positive internal pressure differential (from inside to outside) to elongate the convolutions (see FIG. 3). Conversely, the bellows assembly 40 requires a compressive force to shorten the bellows assembly 40 below its free state, and this force is achieved when there is a negative pressure differential (from to inside to outside) (see FIG. 4). Since the bellows assembly 40 has an internal expansion/contraction volume that is a function of the displacement (x), the volume of the bellows could be inferred from the differential pressure measurement from the inside of the bellows assembly 40 and the outside of the bellows assembly 40 using its "spring rate". In certain aspects, the present invention utilizes this knowledge and differential pressure ("DP") measurements across the bellows assembly 40 for estimation of the utilization of the remaining capacity in the bellows assembly 40.

Pressure sensing devices, including transducer 76 and probe 80 could be added to an existing motor sensor or be daisy chained into other pressure/temperature gauges in the completion string. There could be specific machined ports in the seal guides and control lines placed in ports and connected to the gauge. Once the differential pressure across the bellows assembly 40 is known, this information could be sent back to a variable-frequency drive or other control system and could be processed into a corresponding bellows utilization. By adding one more gauge, one could monitor more bellows elements similar to bellows assembly 40 (in series for example). If the differential pressure ever went to zero, this would indicate a bellows assembly 40 being compromised which is additional information that could be important to the operator.

Different types of pressure sensing devices such as direct placement of fiber optics sensors could be used to sense the differential pressure. Differential pressure is measured and correlated to remaining bellows contraction capacity. It can be seen that the invention provides a system for monitoring conditions associated with a pressure equalizing bellows element 42 within the seal section 26 of an electric submersible pump 22. Pressure sensors 76, 80 detect pressure at first and second sides of a bellows element 42. Controller in gage unit 27 receives signals representative of the detected differential pressure and determines the axial position of the bellows element 42 within the seal section 26 based upon the detected differential pressure.

It can also be seen that the invention provides a pressure-equalizing seal section system that includes a seal section having an outer housing 30 and a bellows element 42 which contains a volume of pressure-balancing fluid and which is axially expandable and contractible within the housing. Pressure sensors 76, 80 detect differential pressure across the bellows element 42.

Also, the invention provides a method of determining the axial position of a bellows element 42 within a seal section 26. Pressure sensors 76, 80 detect pressure on first and second sides of the bellows element 42. Controller in gage unit 27 receives signals representative of the detected pressures and determines the axial position of the bellows element 42 within the seal section 26 based upon the detected differential pressure.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention.

What is claimed is:
1. A system for monitoring conditions associated with a pressure-equalizing bellows element within a seal section of an electric submersible pump assembly, the system comprising:
one or more pressure sensors associated with the seal section to detect differential pressure across the bellows element, the bellows element being axially moveable between contracted and expanded positions within the seal section to accommodate a volume of a pressure-balancing fluid; and
a controller configured to receive a signal representative of the detected differential pressure and to determine axial position of the bellows element within the seal section based upon the detected differential pressure.

2. The system of claim 1 wherein the one or more pressure sensors include at least one electrical pressure transducer.

3. The system of claim 1 wherein the one or more pressure sensors include at least one fiber optic probe.

4. The system of claim 1 further comprising a gage unit housing the controller, the gage unit being incorporated into the electric submersible pump assembly.

5. The system of claim 1 further comprising a first fluid flow port disposed though a housing of the seal section, the first flow port permitting external wellbore fluid to be communicated to a first side of the bellows element; and
    wherein at least one of the one or more pressure sensors is located to detect fluid pressure within the first fluid flow port.

6. The system of claim 5 further comprising a second fluid flow port disposed through a housing of the seal section, the second fluid flow port permitting pressure-balancing fluid to be communicated to a second side of the bellows element; and
    wherein at least one of the one or more pressure sensors is located to detect fluid pressure within the second fluid flow port.

7. The system of claim 6 wherein:
    a first sensor of said one or more pressure sensors detects fluid pressure upon the first side of the bellows element;
    a second sensor of said one or more pressure sensors detects fluid pressure upon the second side of the bellows element; and
    wherein comparison of pressures sensed by the first and second sensors yields the differential pressure across the bellows element.

8. A pressure-equalizing seal section system for an electric submersible pump assembly comprising:
    an outer housing;
    a bellows element retained within the housing, the bellows element being axially expandable and contractible within the housing to accommodate a volume of pressure-balancing fluid contained within the bellows assembly; and
    one or more pressure sensors to detect differential pressure across the bellows element; and
    a controller configured to receive a signal representative of the detected differential pressure and to determine axial position of the bellows element within the seal section based upon the detected differential pressure.

9. The pressure-equalizing seal section system of claim 8 wherein:
    a first sensor of said one or more pressure sensors detects fluid pressure upon the first side of the bellows element;
    a second sensor of said one or more pressure sensors detects fluid pressure upon the second side of the bellows element; and
    wherein comparison of pressures sensed by the first and second sensors yields the differential pressure across the bellows element.

10. The pressure-equalizing seal section system of claim 8 further comprising a gage unit housing the controller, the gage unit being incorporated into the electric submersible pump assembly.

11. The pressure-equalizing seal section system of claim 8 wherein the one or more pressure sensors include at least one electrical pressure transducer.

12. The pressure-equalizing seal section system of claim 8 wherein the one or more pressure sensors include at least one fiber optic probe.

13. The pressure-equalizing seal section system of claim 8 further comprising a first fluid flow port disposed though the housing, the first flow port permitting external wellbore fluid to be communicated to a first side of the bellows element; and
    wherein at least one of the one or more pressure sensors is located to detect fluid pressure within the first fluid flow port.

14. The pressure-equalizing seal section system of claim 13 further comprising a second fluid flow port disposed through the housing, the second fluid flow port permitting pressure-balancing fluid to be communicated to a second side of the bellows element; and
    wherein at least one of the one or more pressure sensors is located to detect fluid pressure within the second fluid flow port.

* * * * *